United States Patent
Scherf et al.

(10) Patent No.: US 7,120,552 B1
(45) Date of Patent: Oct. 10, 2006

(54) METHOD FOR ACTIVATING THE FUNCTIONS OF AN ELECTRICAL APPARATUS

(75) Inventors: Torsten Scherf, Hildesheim (DE); Lothar Vogt, Barienrode (DE); Udo Klaas, Sehnde (DE)

(73) Assignee: Robert Bosch GmbH, Stuttgart (DE)

( * ) Notice: Subject to any disclaimer, the term of this patent is extended or adjusted under 35 U.S.C. 154(b) by 739 days.

(21) Appl. No.: 09/601,715

(22) PCT Filed: Jan. 20, 1999

(86) PCT No.: PCT/DE99/00115

§ 371 (c)(1),
(2), (4) Date: Feb. 22, 2001

(87) PCT Pub. No.: WO99/40491

PCT Pub. Date: Aug. 12, 1999

(30) Foreign Application Priority Data

Feb. 4, 1998 (DE) .................................. 198 04 068

(51) Int. Cl.
*G01R 31/00* (2006.01)
(52) U.S. Cl. ........................... 702/119; 702/120; 700/81
(58) Field of Classification Search ............ 702/57–59, 702/108, 117–120, 122–124, 183, 188; 700/79–81, 700/53; 714/33, 74.2; 701/29, 31
See application file for complete search history.

(56) References Cited

U.S. PATENT DOCUMENTS

| | | | | |
|---|---|---|---|---|
| 3,829,842 A | * | 8/1974 | Langdon et al. | ............. 700/159 |
| 4,158,431 A | * | 6/1979 | VAN Bavel et al. | ........... 714/46 |
| 5,365,438 A | * | 11/1994 | Mitchell et al. | ............... 701/31 |
| 5,369,484 A | * | 11/1994 | Haugen | ....................... 356/326 |
| 5,602,815 A | * | 2/1997 | Klappert et al. | .......... 369/59.25 |
| 5,995,915 A | * | 11/1999 | Reed et al. | .................. 702/119 |
| 5,999,104 A | * | 12/1999 | Symanow et al. | ..... 340/825.22 |
| 6,009,355 A | * | 12/1999 | Obradovich et al. | ........... 701/1 |
| 6,029,262 A | * | 2/2000 | Medd et al. | ................. 714/724 |
| 6,240,347 B1 | * | 5/2001 | Everhart et al. | ............... 701/36 |
| 6,365,438 B1 | * | 4/2002 | Ishida et al. | ................. 438/118 |
| 6,421,631 B1 | * | 7/2002 | Wietzke et al. | ............. 702/183 |

FOREIGN PATENT DOCUMENTS

EP         533098 A1 * 3/1993
EP       0 675 018      10/1995

* cited by examiner

Primary Examiner—Marc S. Hoff
Assistant Examiner—Manuel L Barbee
(74) Attorney, Agent, or Firm—Kenyon & Kenyon LLP

(57) ABSTRACT

A method is proposed that is used for activating the functions of an electrical device, preferably a car radio. A test routine stored in a storage area allocated to the device is executed by a control unit of the electrical device. The control unit activates at least one function of the electrical device on the basis of control commands predefined in the test routine. Information about the function just activated is reproduced on a reproducing device of the electrical device.

9 Claims, 2 Drawing Sheets

METHOD FOR ACTIVATING THE FUNCTIONS OF AN ELECTRICAL APPARATUS

The present invention is based on a method for activating the functions of an electrical device.

Methods for activating the functions of an electrical device are already known, for example, for car radios. In this context, a user is able to activate functions of the car radio by manipulating operating control elements of an operator unit of the car radio. European Published Patent Application No. 0 675 018 describes an information device for manipulable devices of motor vehicles. The information device includes a screen and a selection device for various operating modes of the screen display. In that case, a separate operating mode is provided which is designated as operator information and in which operating control elements individually allocated to the devices, upon being manipulated, trigger a control device for a memory, the control device taking data allocated to the operating control elements from the memory and bringing the data to display on the screen.

SUMMARY OF THE INVENTION

In contrast, the method of the present invention has the advantage that a test routine stored in a storage area allocated to the device is executed by a control unit of the electrical device, that the control unit activates at least one function of the electrical device on the basis of control commands predefined in the test routine, and that information about the function just activated is reproduced on a reproducing device of the electrical device.

In this way, a tutorial can be implemented which guides the user through the operation of the electrical device. In so doing, the functions of the electrical device are introduced to the user one after the other on the reproducing device according to the execution of the test routine by the control unit of the electrical device. This results in a perceptible increase in convenience for the user, since he/she no longer has to read through an operating guide. In addition, the user is able to practice operating the electrical device immediately on the electrical device itself, so that misunderstandings which can arise when reading the operating guide are ruled out to a great extent. There is also an enormous cost reduction, since it is possible to dispense with operating guides completely. Such operating guides are becoming ever more extensive due to the description of an increasing number of features of corresponding electrical devices, thus causing ever greater packing problems and costs, as well. These disadvantages are avoided by the method of the present invention, which makes it possible to do without a separate operating guide in written form.

It is advantageous that, as a function of the information, at least one operating control element of an operator unit of the electrical device is allocated to the at least one function, so that the at least one function is controllable by the at least one operating control element. In this way, the tutorial can introduce the at least one function to the user interactively, i.e., the user can already try out the operation of the electrical device on the electrical device itself during the execution of the tutorial, under guidance by the information reproduced on the reproducing device. Thus, the user is trained on the device itself. Because of this, later operation of the electrical device is made easier for him.

A further advantage is that directions for activating the at least one function by at least one operating control element of the operator unit of the electrical device are conveyed through the information on the reproducing device. In this manner, the functionality of the electrical device is increased and is co-used for reproducing the operating guide. It is thus possible to dispense with a separate operating guide, and a clear relationship of the information, reproduced on the reproducing device, to the operating control elements for activating the at least one function can be produced, above all when the operating control elements are coordinated locally with the reproducing device on the electrical device. In this context, for example, operating control elements can be arranged adjacent to a reproducing device constructed as a display device, or, if desired, operating control elements to be manipulated for activating a function can even be illuminated in a correspondingly predefined sequence.

A further advantage is that the test routine is executed by the control unit as a function of the manipulation of at least one operating control element of the operator unit of the electrical device. In this way, the user can adapt the sequence of the test-routine execution to his needs, that is to say, for example, he can skip those functions of the electrical device described by the test routine whose operation is already familiar to him. Thus, convenience and user-friendliness are further increased.

It is also advantageous that the data, reproducible on the reproducing device as a function of the test routine, are stored in compressed form in the storage area. This makes it possible to save storage space. Alternatively, more information, i.e., information about more functions, can be stored in the storage area.

Another advantage is that a check test of the at least one function is carried out during the execution of the test routine by the control unit. In this way, the functionality of the test routine is increased. At the same time, convenience is increased, since during a functional test of the electrical device, the user is supported by the test routine with the aid of the information offered to him by the reproducing device.

It is also advantageous that the control unit invokes test signals for functional settings of the electrical device stored in the storage area as a function of the test routine. In this way, the user can also be supported for functional settings, e.g., for equalizer settings, by the test routine which makes the necessary test signals available for the user without operator manipulation, and which optionally backs up the functional settings through corresponding information on the reproducing device. Thus, convenience for the user is further increased.

A further advantage is that a storage medium, which includes the storage area and is inserted into the electrical device, is only enabled by a predefined keyboard combination on the operator unit. This permits protection of the storage medium from theft, even without an access-authorization card. Therefore, the tutorial could be used by several users, such as in a specialty store, in order to become acquainted with the electrical device. The electrical device would then be operational for the various users even without an individual access-authorization card, and the storage medium would nevertheless be protected from theft.

Likewise advantageous is that the control commands of the test routine are stored in gaps between speech- and/or music data on a storage medium 40 constructed as an audio compact disc. In this way, an audio compact disc can be used as storage medium, thus making it possible to save the manufacturing and materials expenditure for a special storage medium to store control commands. Convenience is increased for the user, since he is able to use audio compact discs consistently both for the operating guide and to enjoy music.

DETAILED DESCRIPTION

Figure 1:
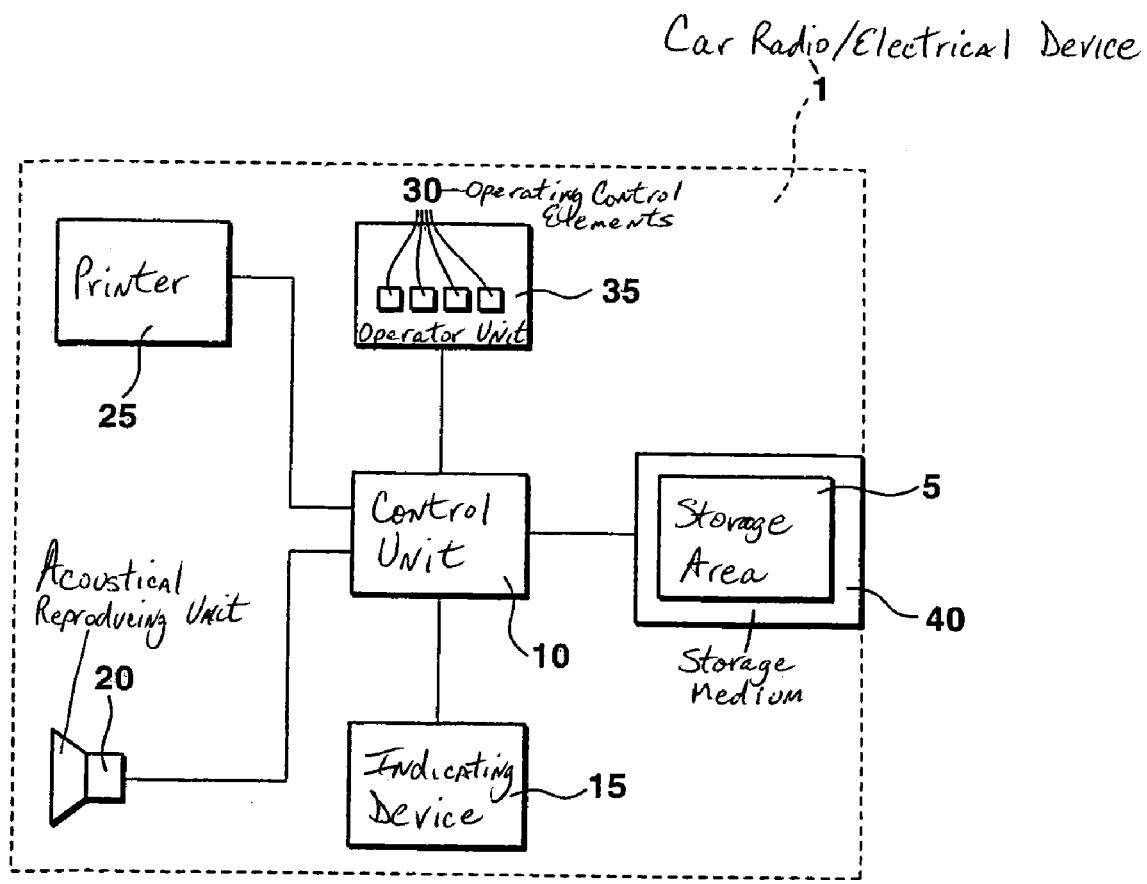
FIG. 1 shows a block diagram of an electrical device constructed as a car radio.

In FIG. 1, 1 designates an electrical device constructed as a car radio. A storage area 5 is allocated to car radio 1. In this exemplary embodiment, storage area 5 is provided on a storage medium 40 constructed as a compact disk; however, it can also be permanently arranged in electrical device 1 or outside of electrical device 1, but in allocation to it, i.e., connected to electrical device 1, and can be constructed, for example, as a read-only memory (ROM) or a read-write memory (RAM). Storage medium 40 can also be constructed as an access-authorization card whose stored data are read by a corresponding card reader in a card slot optionally disposed in car radio 1. In this context, the access-authorization card can have a memory chip and/or a magnetic strip and/or the like for accommodating storage area 5.

In this case, compact disk 40 is inserted into a compact disk drive of car radio 1. However, the compact disk drive can also be connected externally, e.g., in the form of a compact disc changer, to car radio 1. Car radio 1 includes a control unit 10 which is connected to storage area 5. Also connected to control unit 10 is an operator unit 35 which includes operating control elements 30. Furthermore, an acoustical reproducing unit 20 constructed as a loudspeaker is connected to control unit 10. Optionally, an indicating device 15, constructed as a display, and a printer 25 can also be connected to control unit 10.

At present, specialty stores are offering many car radios whose operating panels look relatively uniform and generally provide a similar arrangement of the operating control elements. It is precisely in the marketing channel of specialized discount stores, which are gaining ever more importance, that sales personnel are scarce, and consulting service is increasingly taking a back seat to the argument of price. Therefore, skilled personnel often lack the time to explain more than the basic features of the various car radios to their customers.

The operating guides, which are ever more extensive because of the increase in the number of features, represent a further problem for the user. The result is that the user generally lacks the time and motivation to read through the operating guide. In addition, the functioning of the device in question cannot always be consistently gathered from the operating guide.

According to the exemplary embodiment described, the car radios are able to explain themselves and to save the trade sales personnel, as well.

A test routine is filed in storage area 5 of compact disk 40, which can also be designed as a CD-ROM. The test routine is executed by control unit 10 and is used for activating the functions of car radio 1. During the execution of the test routine, control unit 10 causes data to be reproduced at display 15 and/or at loudspeaker 20 and/or at printer 25. At the same time, the data are likewise stored in storage area 5 of compact disk 40. After inserting compact disk 40 into the corresponding disk drive allocated to car radio 1 and manipulating one of operating control elements 30, a demonstration program is started in which attention is drawn to a, for example, animated graphic presentation on display 15, optionally combined with speech and/or music output on car radio 1. If desired, one of operating control elements 30 can cause control unit 10 to switch over between acoustic reproduction at loudspeaker 20 and optical reproduction at display 15. If a user turns toward car radio 1 and manipulates one of operating control elements 30, then he intervenes interactively in the program run of the test routine, and thus starts a subroutine which guides him interactively through functions of car radio 1 or, at least, however, through one such function. Control unit 10 activates the corresponding functions of car radio 1 on the basis of control commands predefined in the test routine or in the corresponding subroutine. Information about the function just activated is then reproduced at display 15 and/or at loudspeaker 20 and/or at printer 25. The information conveys directions for activating the corresponding functions by at least one of operating control elements 30. Thus, the features of car radio 1 are explained in detail to the user.

For example, the user is guided through the functions of car radio 1 with the aid of a verbal user prompting which is stored on this compact disk 40. The control commands are stored in short gaps between speech- and/or music data. Control unit 10 of car radio 1 decodes this data. When specific inserted data sequences are recognized, they are interpreted as control commands. In this way, even conventional audio compact disks can be used as storage medium 40. Compact disk 40 can also include a part which corresponds to the data format of a CD-ROM. On this, for example, it is possible to store a conventional operating guide of car radio 1, an installation guide for installing car radio 1 in an insertion compartment of a motor vehicle and/or the like.

The test routine and the corresponding subroutine, respectively, can be executed by control unit 10 as a function of the manipulation of at least one of operating control elements 30. This means that, by manipulating at least one of operating control elements 30, the user himself controls the sequence and content of the test routine or of the corresponding subroutine, and thus can adjust to his own needs. Therefore, the user can have the test routine or the corresponding subroutine explain only the functions of car radio 1 which interest him or with which he is not yet familiar. He can skip other functions.

Provision can also be made for at least one of operating control elements 30 to be allocated, as a function of the reproduced information, to the function just activated by the test routine or the corresponding subroutine, so that this function is controllable by the at least one operating control element 30. Thus, the user can interactively use a function just activated with the aid of the test routine or the corresponding subroutine and, for example, try it out to become familiar with it. If display 15 is arranged adjacent to operator unit 35, i.e., operating control elements 30, then the information reproduced on display 15 can be allocated locally to the corresponding operating control elements 30 and can optionally also be illuminated for marking. In this manner, operating errors are prevented for the user.

The voice signals reproducible at loudspeaker 20 during the execution of the test routine or the corresponding subroutine are stored in digitalized form in storage area 5 and are converted into analog voice signals by control unit 10 before reproduction at loudspeaker 20. In order to save storage space in storage area 5, the voice signals can be digitally stored there as mono voice signals, since the tutorial does not depend upon optimal voice or tone quality. The data reproducible at display 15 and/or at printer 25 can also be stored in storage area 5 in digitalized form. Storage space can also be saved in storage area 5 for the storage of the data reproducible at display 15 and/or at loudspeaker 20 and/or at printer 25 by reducing the sampling rate when digitalizing this data prior to storage. In this way, a greater quantity of data can be stored in storage area 5 of compact disk 40, and because of this, a greater extent of the capacity of car radio 1 can be taken into account for the processing of the tutorial and the description of the functions of car radio 1. More data can then be stored in storage area 5, and therefore more features of car radio 1 can be described by the tutorial.

To save storage space in storage area 5, data which is reproducible as a function of the test routine or of the corresponding subroutine can also be compressed in another manner, such as by using suitable coding methods, and stored in storage area 5.

Provision can also be made for check testing at least one of the functions of car radio 1 during the execution of the test routine by control unit 10.

Furthermore, test signals could be stored in storage area 5 which are invoked during the execution of the test routine by control unit 10. For example, the test signals can be swept signals and can be evaluated by control unit 10 for an automated equalizer adjustment. However, provision can also be made for control unit 10 to cause the test signals to be reproduced at loudspeaker 20 and/or at display 15, so that, using at least one of operating control elements 30, the user can personally carry out the equalizer adjustments, cited by way of example, based on the reproduced test signals, according to his needs.

Car radio 1 can be provided ready to operate without access authorization card, especially for the application case of presenting car radio 1 in a specialty store, so that compact disk 40 can be run without an access authorization card. A loss of such an access authorization card would then not lead to the failure of the corresponding car radio 1. To nevertheless prevent theft of compact disk 40, and to release the skilled personnel from responsibility, provision can be made for compact disk 40 to be enabled only by a predefined keyboard combination on operator unit 35.

For the case when a car radio 1 according to the present invention makes the use of an operating guide superfluous, service telephone numbers, addresses of service centers, catalog pages and a system calibration program for checking the functioning of car radio 1 could also be stored on compact disk 40 and be brought to display on display 15 by a separate operating control function. Furthermore, information about an entire device family could also be stored on compact disk 40 and brought to display on display 15 with the aid of a separate information operating control function of car radio 1.

Figure 2:
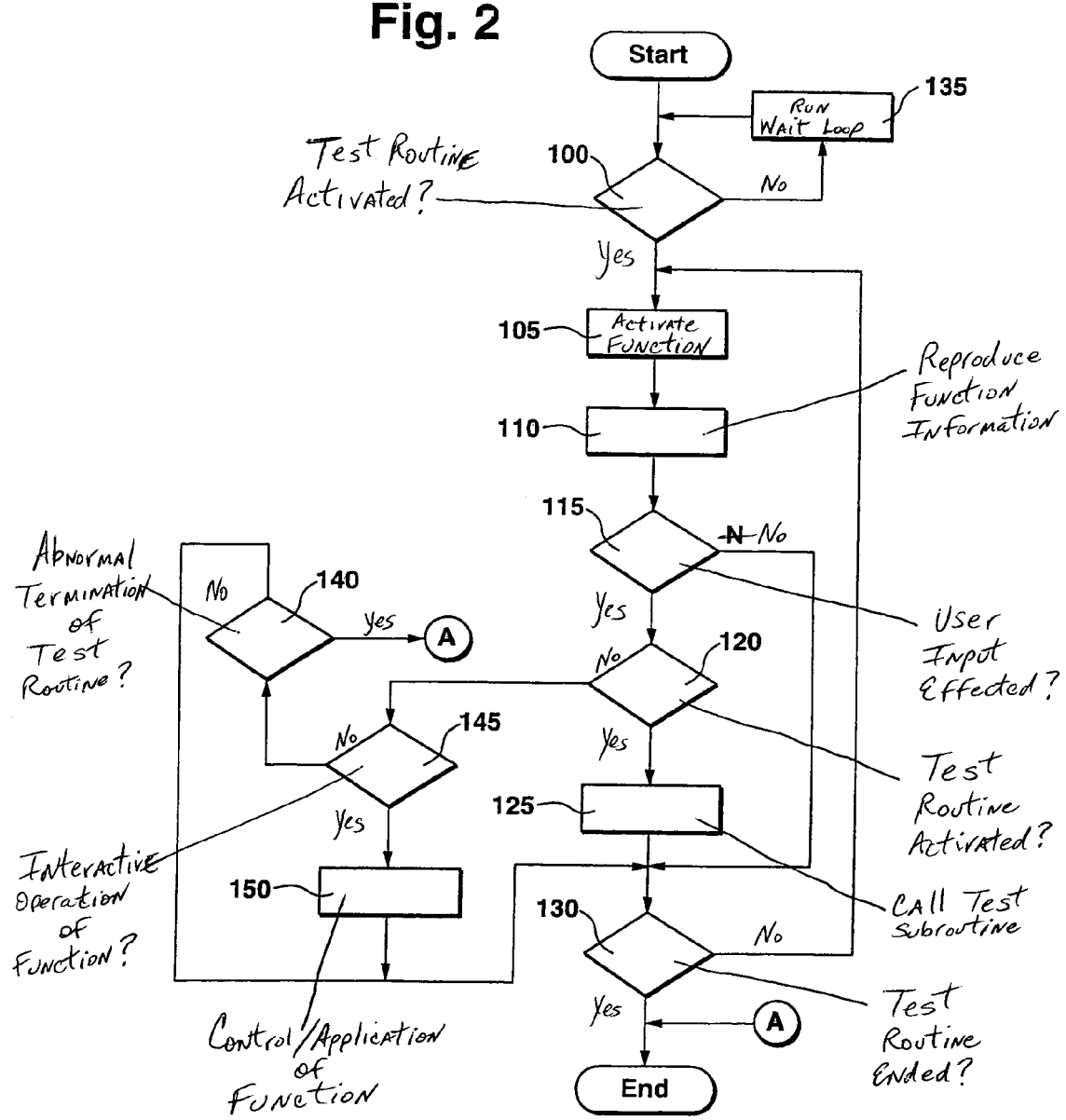
FIG. 2 shows a flow chart for a control of the electrical device.

FIG. 2 shows a flow chart for the functioning method of the control for executing the tutorial. At a program point 100, control unit 10 checks whether the test routine was activated by manipulation of one of operating control elements 30. If this is the case, a jump is made to a program point 105; otherwise to a program point 135. At program point 135, a wait loop is run through. Subsequently, there is a jump back to program point 100. At program point 105, control unit 10 causes the activation of a function of car radio 1. Subsequently, there is a branch off to a program point 110. At program point 110, control unit 10 causes information, stored in storage area 5, about the function of car radio 1 just activated to be reproduced at display 15 and/or at loudspeaker 20 and/or at printer 25. This enables the user to become familiar with the function just activated on car radio 1 by the test routine, since the information includes directions for activating the function with the aid of at least one of operating control elements 30. In the case of the information reproduction according to program point 110, at least one of operating control elements 30 can also be activated for the interactive use of the function just activated or for controlling the sequence of the test routine. For that purpose, operating control element(s) 30 appropriately activated in this manner can be marked, for example, by illumination and/or, if operator unit 35 and display 15 are arranged adjacent to one another, by local coordination of the information presentation on display 15 with the correspondingly activated operating control elements 30. Following, a jump is made to a program point 115. At program point 115, control unit 10 checks whether a user input was effected at operator unit 35. If this is the case, a jump is made to a program point 120; otherwise to a program point 130. At program point 120, control unit 10 checks whether a test subroutine for checking the function just activated was invoked by the user input. If this is the case, a jump is made to a program point 125; otherwise to a program point 145. At program point 125, control unit 10 causes a test subroutine to be called up from storage area 5 for checking the function of car radio 1 just activated. In this context, the function just activated can be checked interactively by the user with the aid of operator unit 35 on the basis of test information reproduced at display 15 and/or at loudspeaker 20 and/or by printer 25. At the same time, the test information is likewise stored in storage area 5 and is loaded by control unit 10 for carrying out the test subroutine and is reproduced at display 15 and/or at loudspeaker 20 and/or at printer 25. After program point 125, jump is made to a program point 130. At program point 130, control unit 10 checks whether the end of the test routine has been reached. If this is the case, the program part is exited; otherwise a jump is made back to program point 105. In so doing, the next function of car radio 1 is activated and the last activated function of car radio 1 is deactivated. At program point 145, control unit 10 checks whether the user input caused an interactive operation of the function of car radio 1 just activated. If this is the case, a jump is made to a program point 150; otherwise to a program point 140. At program point 150, control unit 10, on the basis of the user input, induces an appropriate control or application of the function of car radio 1 just activated. Depending on the control of the function just activated, the user operation can also cause the function just activated to be skipped, for example, when the user is already familiar with this function. In this case, at program point 150, control unit 10 causes the function of car radio 1 just activated to be deactivated. After program point 150, a jump is made to program point 130. At program point 140, control unit 10 checks whether the user input caused an abnormal termination of the test routine. If this is the case, the program part is exited; otherwise there is a jump to program point 130.

The method of the present invention is not limited to car radios. Rather, it is applicable to all electrical devices having operating control functions, i.e., to telephones, mobile phone devices, television sets, compact disk tuners, cassette car radio devices, compact disk changers, compact disk players, household devices such as washing machines, etc., as well.

What is claimed is:

1. A method for activating at least one function of an electrical device, comprising the steps of:
   causing a control unit of the electrical device to execute a test routine stored in a storage area allocated to the electrical device;
   causing the control unit to activate the at least one function on the basis of control commands predefined in the test routine; and
   reproducing information about an operation of the activated at least one function on a reproducing device of the electrical device;
   wherein a sequence of the test routine executed by the control unit varies as a function of a manipulation of at least one operating control element of an operator unit of the electrical device.

2. The method according to claim 1, wherein:
   the electrical device corresponds to a car radio.

3. The method according to claim 1, further comprising the step of:
   allocating, as a function of the information, at least one operating control element of an operator unit of the electrical device to the at least one function such that the at least one function is controllable by the at least one operating control element.

4. The method according to claim 1, further comprising the step of:
   conveying directions for activating the at least one function by at least one operating control element of an operator unit of the electrical device through the information on the reproducing device.

5. The method according to claim 1, further comprising the step of:
   storing data, which are reproducible on the reproducing device as a function of the test routine, in compressed form in the storage area.

6. The method according to claim 1, further comprising the step of:
   performing a check test of the at least one function during the execution of the test routine.

7. The method according to claim 1, further comprising the step of:
   enabling a storage medium including the storage area and inserted into the electrical device only by a predefined keyboard combination on an operator unit.

8. The method according to claim 1, wherein:
   the information is reproduced on at least one of a display device, an acoustical reproducing unit, and a printer.

9. The method according to claim 1, further comprising the step of:
   storing the control commands in gaps between at least one of speech data and music data on a storage medium constructed as an audio compact disk.

* * * * *

UNITED STATES PATENT AND TRADEMARK OFFICE
CERTIFICATE OF CORRECTION

PATENT NO. : 7,120,552 B1 Page 1 of 1
APPLICATION NO. : 09/601715
DATED : October 10, 2006
INVENTOR(S) : Scherf et al.

It is certified that error appears in the above-identified patent and that said Letters Patent is hereby corrected as shown below:

Column 1, line 4, insert --BACKGROUND INFORMATION--

Signed and Sealed this

Sixth Day of November, 2007

JON W. DUDAS
*Director of the United States Patent and Trademark Office*